USOO5752081A

United States Patent [19]
Jirgal

[11] Patent Number: 5,752,081
[45] Date of Patent: May 12, 1998

[54] SIGNALLING SYSTEM AND METHOD FOR ALLOWING A DIRECT MEMORY ACCESS (DMA) INPUT/OUTPUT (I/O) DEVICE ON THE PERIPHERAL COMPONENT INTERCONNECT (PCI) BUS TO PERFORM DMA TRANSFERS

[75] Inventor: James J. Jirgal, Chandler, Ariz.

[73] Assignee: VLSI Technology, Inc., San Jose, Calif.

[21] Appl. No.: 488,989

[22] Filed: Jun. 8, 1995

[51] Int. Cl.⁶ .................. G06F 15/16; G06F 13/00; G06F 13/28
[52] U.S. Cl. .................. 395/842; 395/843; 395/848
[58] Field of Search .................. 395/842, 848, 395/843, 287, 856, 828

[56] References Cited

U.S. PATENT DOCUMENTS

| | | | |
|---|---|---|---|
| 4,099,236 | 7/1978 | Goodman et al. | 364/200 |
| 4,490,788 | 12/1984 | Rasmussen | 364/200 |
| 4,729,090 | 3/1988 | Baba | 364/200 |
| 5,212,795 | 5/1993 | Hendry | 395/725 |
| 5,381,538 | 1/1995 | Amini et al. | 395/425 |
| 5,438,666 | 8/1995 | Craft et al. | 395/842 |
| 5,442,753 | 8/1995 | Waldrop et al. | 395/842 |
| 5,450,551 | 9/1995 | Amini et al. | 395/299 |
| 5,517,325 | 5/1996 | Shimatani | 358/444 |
| 5,561,820 | 10/1996 | Bland et al. | 395/847 |
| 5,655,151 | 8/1997 | Bowes et al. | 395/842 |

*Primary Examiner*—Thomas C. Lee
*Assistant Examiner*—Rehana Perveew
*Attorney, Agent, or Firm*—Harry M. Weiss; Jeffrey D. Moy; Harry M. Weiss & Associates, P.C.

[57] ABSTRACT

The present invention relates to an apparatus and method for supporting DMA I/O devices on a PCI bus. A DMA I/O device is coupled to a DMA controller via a serial link and two signal lines. The serial link is used by the DMA I/O device to request a DMA transfer. When the DMA controller receives the serialized DMA request, it sends a signal to an arbiter and waits for the PCI bus to be granted to the DMA controller for use during the DMA transfer. When granted the PCI bus, the DMA controller signals the DMA I/O device. The DMA I/O device asserts a signal in response to the one asserted by the DMA controller. The DMA controller recognizes the signal asserted by the DMA I/O device and continues with the DMA transfer. The transfer continues for as long as the DMA I/O device continues to assert the signal or for as long as the DMA controller is programmed.

15 Claims, 2 Drawing Sheets

5,752,081

SIGNALLING SYSTEM AND METHOD FOR ALLOWING A DIRECT MEMORY ACCESS (DMA) INPUT/OUTPUT (I/O) DEVICE ON THE PERIPHERAL COMPONENT INTERCONNECT (PCI) BUS TO PERFORM DMA TRANSFERS

BACKGROUND OF THE INVENTION

1. Field of the Invention

This invention relates generally to direct memory access (DMA) input/output (I/O) devices and, more specifically, to an apparatus and method for supporting DMA I/O devices on the peripheral component interconnect (PCI) bus.

2. Description of the Prior Art

A PCI bus does not provide any direct support for DMA devices. This is a problem for many types of machines, e.g. International Business Machines (IBM) AT compatible machines, which use a DMA programming model. Any machine that does not support its DMA programming model will not support even the most basic function such as reading a floppy disk.

The original IBM AT possessed an Industry Standard Architecture (ISA) bus which provided direct support for DMA I/O devices through DRQ/DACK# signal pairs. Each installed DMA I/O device attached directly to one dedicated signal pair out of a possible seven (7) signal pairs. However, these pairs were not easily shareable between independent DMA I/O devices.

To support a DMA programming model in a PCI based system, the DMA device would have to be located on some form of an ISA bus. Until now, any I/O device which would normally use DMA would have to become a PCI busmaster and use a different programming model. This alternative is not acceptable if AT compatibility is required.

A DMA device located on a PCI bus uses a signaling mechanism to request a DMA transfer. The signaling mechanism, which is a serial link, is useful in transmitting initial DMA requests, but it is inadequate for maintaining a DMA transfer once the DMA transfer has been initiated. The reason for this inadequacy is that DMA devices require the ability to signal the real time state of its request signal in order to prevent data overruns and data underruns.

Present-day systems have begun to standardize on the PCI bus for its higher data throughput capabilities. However, its lack of AT-compatible DMA support forced systems to also provide an ISA bus. This adds unnecessary expense due to the addition of the large number of signal pins of the ISA bus. To support a DMA programming model in a PCI based system would require the addition of 14 signal pins from the ISA bus. This is unacceptable for systems wishing to keep their pin count, and thus their cost, low.

Therefore a need existed to provide an apparatus and method for supporting DMA I/O devices on a PCI bus. The method and apparatus must support the DMA I/O devices without the use of an ISA interface. Furthermore, the apparatus and method must support DMA I/O devices without the use of an ISA interface while maintaining an AT compatible DMA program model.

SUMMARY OF THE INVENTION

In accordance with one embodiment of the present invention, it is an object of the present invention to provide an apparatus and method to support DMA I/O devices on a PCI bus.

It is another object of the present invention to provide an apparatus and method to support DMA I/O devices without the use of an ISA interface.

It is still another object of the present invention to provide an apparatus and method to support DMA I/O devices without the use of an ISA interface while maintaining an AT compatible DMA program model.

BRIEF DESCRIPTION OF THE PREFERRED EMBODIMENTS

In accordance with one embodiment of the present invention, a system for supporting DMA I/O devices on a PCI bus is disclosed. The system is comprised of at least one DMA I/O device for receiving memory data transferred from memory and for transferring data to memory; a DMA controller coupled to the DMA I/O device for receiving a signal from the DMA I/O device that a DMA transfer is required and for permitting transfer of memory data to the DMA I/O device from memory and for transferring data from the DMA I/O device to memory; a signaling mechanism coupled to the DMA I/O device and the DMA controller for allowing the DMA I/O device to signal the DMA controller that a DMA transfer is required; an arbiter coupled to the DMA controller for receiving a signal from the DMA controller that a DMA transfer has been requested and for granting the DMA transfer; a first signal line coupled to the DMA I/O device and to the DMA controller for signaling the DMA I/O device when the DMA transfer has been granted; a second signal line coupled to the DMA I/O device and to the DMA controller for signaling the DMA controller when the DMA I/O device acknowledges that the DMA transfer has been granted; and a PCI bus coupled to the DMA I/O device for carrying data from the DMA I/O device to memory and for carrying memory data from the memory to the DMA I/O device.

In accordance with another embodiment of the present invention, a method of transferring memory data from memory to a DMA I/O device coupled to a PCI bus is disclosed. The method is comprised of the steps of: providing a system to support DMA I/O devices on a PCI bus comprising: at least one DMA I/O device for receiving memory data transferred from memory to the DMA I/O device; a DMA controller coupled to the DMA I/O device for receiving a signal from the DMA I/O device that a DMA transfer is required and for permitting transfer of the memory data to the DMA I/O device from memory; a signaling mechanism coupled to the DMA I/O device and the DMA controller for allowing the DMA I/O device to signal the DMA controller that a DMA transfer is required; an arbiter coupled to the DMA controller for receiving a signal from the DMA controller that a DMA transfer has been requested and for granting the DMA transfer; a first signal line coupled to the DMA I/O device and to the DMA controller for signaling the DMA I/O device when the DMA transfer has been granted; a second signal line coupled to the DMA I/O device and to the DMA controller for signaling the DMA controller when the DMA I/O device acknowledges that the DMA transfer has been granted; and a PCI bus coupled to the DMA I/O device for carrying the memory data to the DMA I/O device from memory; sending a signal from the DMA I/O device to the DMA controller via the signaling mechanism coupled to the DMA I/O device and the DMA controller requesting a DMA transfer from memory to the DMA I/O device; sending a signal from the DMA controller to the arbiter when the DMA controller receives the signal that the DMA transfer from memory to the DMA I/O device is required; waiting for a grant signal from the DMA controller indicating that the DMA controller is ready to execute a DMA cycle; sending a signal from the DMA controller to the DMA I/O device indicating that the DMA cycle has been granted; sending a signal from the DMA I/O device to the DMA controller acknowledging the signal from the DMA controller to the DMA I/O device that the DMA cycle has been granted; and transferring the memory data from memory to the DMA I/O device.

In accordance with still another embodiment of the present invention, a method of transferring data from a DMA I/O device coupled to a PCI bus to memory is disclosed. The method is comprised of the steps of: providing a system to support DMA I/O devices on a PCI bus comprising: at least one DMA I/O device for transferring data to memory; a DMA controller coupled to the DMA I/O device for receiving a signal from the DMA I/O device that a DMA transfer is required and for permitting transfer of data from the DMA I/O device to memory; a signaling mechanism coupled to the DMA I/O device and the DMA controller for allowing the DMA I/O device to signal the DMA controller that a DMA transfer is required; an arbiter coupled to the DMA controller for receiving a signal from the DMA controller that a DMA transfer has been requested and for granting the DMA transfer; a first signal line coupled to the DMA I/O device and to the DMA controller for signaling the DMA I/O device when the DMA transfer has been granted; a second signal line coupled to the DMA I/O device and to the DMA controller for signaling the DMA controller when the DMA I/O device acknowledges that the DMA transfer has been granted; and a PCI bus coupled to the DMA I/O device for carrying the data from the DMA I/O device to memory; sending a signal from the DMA I/O device to the DMA controller via the signaling mechanism between the DMA I/O device and the DMA controller requesting the DMA transfer from the DMA I/O device to memory; sending a signal from the DMA controller to the arbiter when the DMA controller receives the signal that the DMA transfer from the DMA I/O device to memory is required; waiting for a grant signal from the DMA controller indicating that the DMA controller is ready to execute a DMA cycle; sending a signal from the DMA controller to the DMA I/O device that the DMA cycle has been granted; sending a signal from the DMA I/O device to the DMA controller acknowledging the signal from the DMA controller to the DMA I/O device that the DMA cycle has been granted; and transferring the data from the DMA I/O device to memory.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
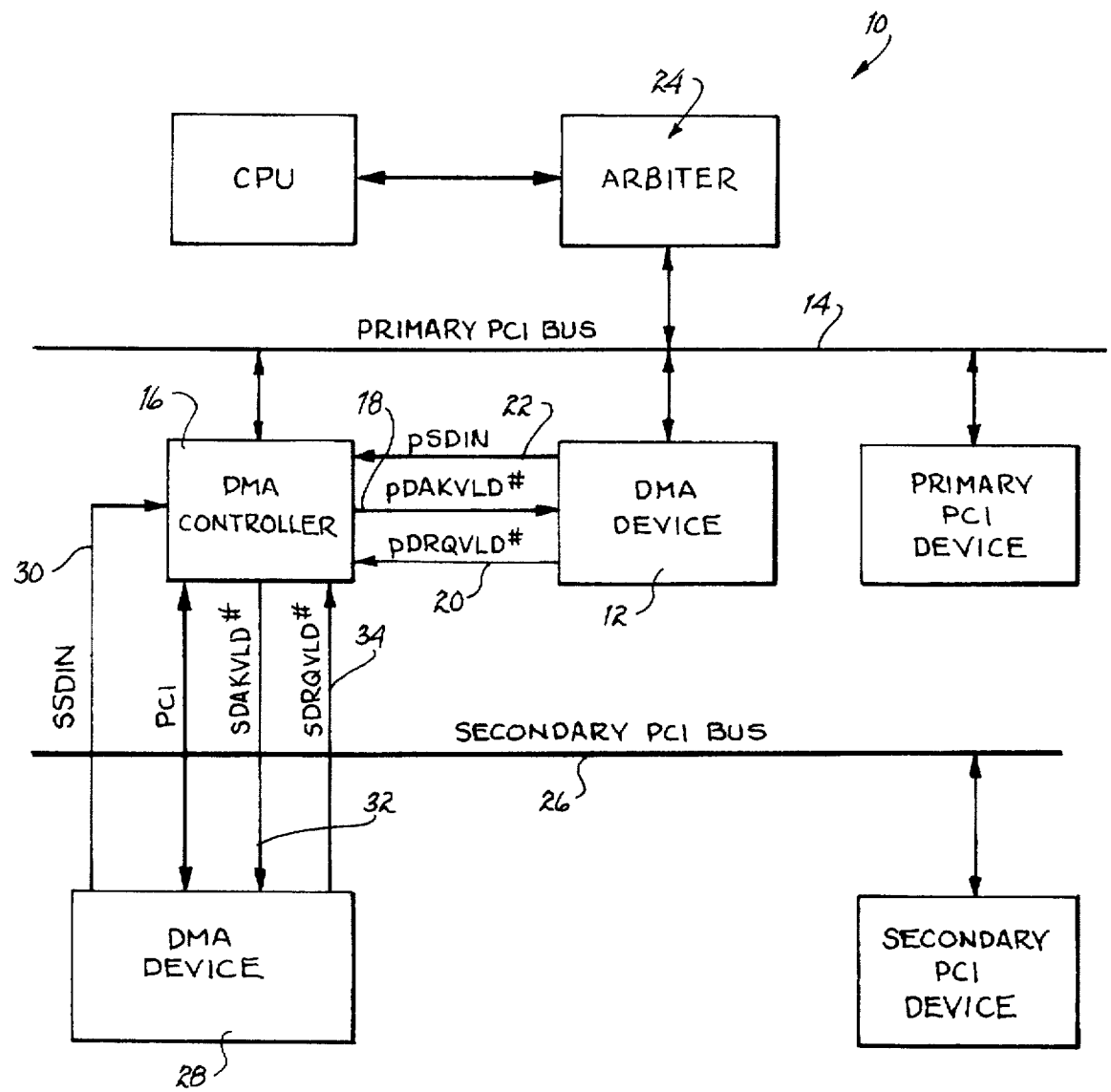
FIG. 1 shows a simplified block diagram depicting the supporting system of the present invention.

Referring to FIG. 1, a system 10 for supporting DMA I/O devices on a PCI bus (hereinafter system 10) is shown. The system 10 is comprised of at least one DMA I/O device 12. The DMA I/O device 12 is used for transferring data from the DMA I/O device 12 to memory (not shown) and for receiving data transferred from memory to the DMA I/O device 12. Some examples of a DMA I/O device 12 are a floppy controller and a printer.

The DMA I/O device 12 is coupled to a PCI bus 14. The PCI bus 14 is used for carrying data from the DMA I/O device 12 to memory during a DMA write cycle and for carrying data to the DMA I/O device 12 from memory during a DMA read cycle.

An AT compatible DMA controller 16 is coupled to the DMA I/O device 12. The DMA controller 16 provides support for the DMA I/O device 12 through the use of a first control signal line 18, a second control signal line 20, and a signaling mechanism 22. In a preferred embodiment of the present invention, the signaling mechanism is a serial link. The DMA controller 16 also controls the transfer of data from the memory to the DMA I/O device 12 during a DMA read cycle and controls the transfer of data from the DMA I/O device 12 to memory during a DMA write cycle.

An arbiter 24 is coupled to the DMA controller 16. The arbiter 24 is used for receiving a signal from the DMA controller 16 that a DMA I/O device 12 has requested a DMA transfer. The arbiter 24 then grants the PCI bus 14 to the DMA controller 16 so that the PCI bus 14 may be used during the DMA transfer.

According to another embodiment of the present invention, system 10 may be comprised of secondary PCI bus 26 coupled to the DMA controller 16. The secondary PCI bus 26 is used for carrying data during a DMA transfer over the secondary PCI bus 26.

At least one secondary DMA I/O device 28 is coupled to the secondary PCI bus 26. The secondary DMA I/O device 28 is used for receiving data transferred from the memory to the secondary DMA I/O device 28 and for transferring data to the memory from the secondary DMA I/O device 28. The secondary DMA I/O device 28 is coupled to the DMA controller 16 by signaling mechanism 30, first control signal line 32, and a second control signal line 34. In the preferred embodiment of the present invention, the signaling mechanism 30 is a serial link. The DMA controller 16 provides support for the secondary DMA I/O device 28 through the use of the aforementioned signal lines.

OPERATION OF THE APPARATUS

When a DMA I/O device 12 determines that a DMA transfer is required, the DMA I/O device 12 signals the DMA controller 16 through the serial link 22 of the requirement. When the DMA controller 16 receives the serialized DMA request, the DMA controller 16 sends a signal to the arbiter 24 that a DMA transfer has been requested. The DMA controller then waits for the arbiter 24 to grant the use of the PCI bus 14 to the DMA controller 16 for the DMA transfer. When granted the PCI bus 14, the DMA controller 16 asserts a DMA acknowledge valid signal (DAKVLD#) across the first control signal line 18 to the DMA I/O device 12. The DMA controller also asserts a code indicating the active DMA channel on a subset of the PCI bus 14. The DMA I/O device 12 recognizes the DAKVLD# assertion in combination with its encoded DMA channel and asserts a DMA request valid signal (DRQVLD#) in response to the DAKVLD# signal across the second control signal line 20. It should be noted that since the DRQVLD# signal is the realtime representation of the DMA I/O device's 12 DMA request, all AT compatible DMA modes will be supported. The DMA controller 16 recognizes the DRQVLD# signal asserted by the DMA I/O device 12 and continues with the DMA transfer.

Similar to the DMA I/O device 12, the secondary DMA I/O device 28 may also request a DMA transfer. When the secondary DMA I/O device 28 requires a DMA transfer, the secondary DMA I/O device 28 signals the DMA controller 16 via the signaling mechanism 30. When the DMA controller receives the serialized DMA request, it sends a signal to the arbiter 24 and waits for the arbiter 24 to grant the use of the secondary PCI bus 26 for the DMA transfer. When the DMA controller 16 is granted the secondary PCI bus 26, the DMA controller 16 asserts a DAKVLD# signal across a first signal line 32 to the secondary DMA I/O device 28. The DMA controller 16 also asserts a code indicating the active DMA channel on a subset of the secondary PCI bus. The secondary DMA I/O device 28 recognizes the DAKVLD# signal in combination with the encoded DMA channel and asserts a DRQVLD# signal across the second control signal line 34 in response. The DMA controller 16 recognizes the DRQVLD# signal asserted by the secondary DMA I/O device 28 and continues with the DMA transfer.

DMA TRANSFER FROM A DMA I/O DEVICE TO MEMORY

The process of transferring data from a DMA device to memory is the same whether the DMA device is a DMA I/O device 12 coupled to the PCI bus 14 or whether the DMA device is a secondary DMA I/O device 28 coupled to the secondary PCI bus 26. The only difference in the process is that a DMA transfer from a DMA I/O device 12 to memory will involve the lines 18, 20, 22 and the PCI bus 14, while a DMA transfer from a secondary DMA I/O device 28 to memory will involve the lines 30, 32, 34 and the secondary PCI bus 26. Therefore, the following description of a DMA write to memory will be referenced to a DMA I/O device 12 with one keeping in mind that the same process will occur for a write from a secondary DMA I/O device 28 to memory except that the lines and bus will differ.

Figure 2:
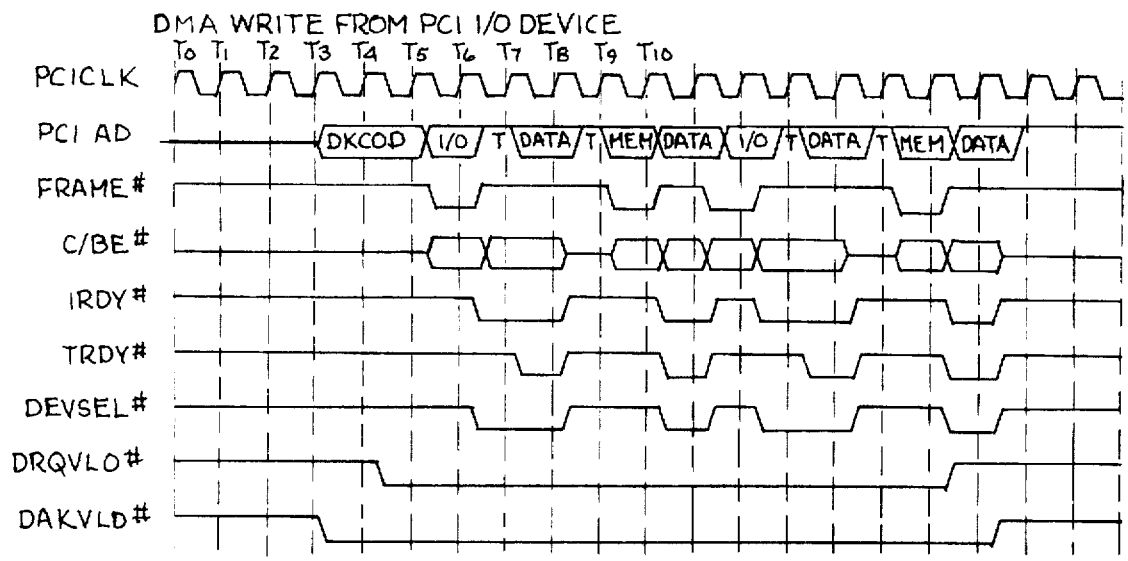
FIG. 2 shows a timing diagram depicting a DMA transfer from a DMA I/O device to memory.

As stated above, a DMA transfer from a DMA I/O device 12 to memory begins with the DMA I/O device 12 requesting a DMA transfer and the arbiter 24 granting the PCI bus 14 to the DMA controller 16 for the transfer. Referring to FIGS. 1 and 2, after the DMA controller 16 is granted the PCI bus, the DMA controller 16 asserts a DAKVLD# signal to the DMA I/O device 12 at a time $T_3$. During the same PCI clock cycle $T_3$, the DMA controller 16 presents an encoded state of the DMA controller's 16 internal active DMA acknowledge signal (DACK#) and terminal count signal (TC) on the PCI bus 14. The DMA I/O device 12 must acknowledge the DAKVLD# signal within two PCI clock cycles. As can be seen from FIG. 2, the DMA I/O device 12 acknowledges the DAKVLD# signal by asserting the DRQVLD# signal during the next PCI clock cycle, $T_4$. The DMA I/O device 12 keeps the DRQVLD# signal asserted until the DMA I/O device 12 does not require any more DMA cycles.

After the exchange of DAKVLD# and DRQVLD# signals, the address of the DMA I/O device 12 is placed on the PCI bus 14 during the PCI clock cycle $T_5$. The DMA controller 16 will read the data from the DMA I/O device 12 to a temporary storage location at a time $T_7$. The temporary storage location is generally the DMA controller 16. The address of the memory location to where the data will be written to is then placed on the PCI bus 14 during the PCI clock cycle $T_9$. The DMA controller 16 then writes the data to the memory location at a time $T_{10}$. This process continues for as long as the DMA I/O device 12 keeps the DRQVLD# signal asserted or for as long as the DMA controller 16 is programmed. When the DMA I/O device 12 is finished with the DMA transfer, the DMA I/O device 12 deasserts the DRQVLD# signal and the DMA transfer is completed when the DMA controller 16 deasserts DAKVLD# in response.

DMA TRANSFER FROM MEMORY TO DMA I/O DEVICE

The process of transferring memory data from memory to a DMA device is the same whether the DMA device is a DMA I/O device 12 coupled to the PCI bus 14 or the DMA device is a secondary DMA I/O device 28 coupled to the secondary PCI bus 26. The only difference in the process is that a DMA transfer from memory to a DMA I/O device 12 will involve the lines 18, 20, 22 and the PCI bus 14, while a DMA transfer from memory to a secondary DMA I/O device 28 will involve the lines 30, 32, 34 and the secondary PCI bus 26. Therefore, the following description of a DMA transfer from memory to a DMA device will be referenced to a DMA I/O device 12 with one keeping in mind that the same process will occur for a DMA transfer from memory to a secondary DMA I/O device 28 except that the lines and bus will differ.

Figure 3:
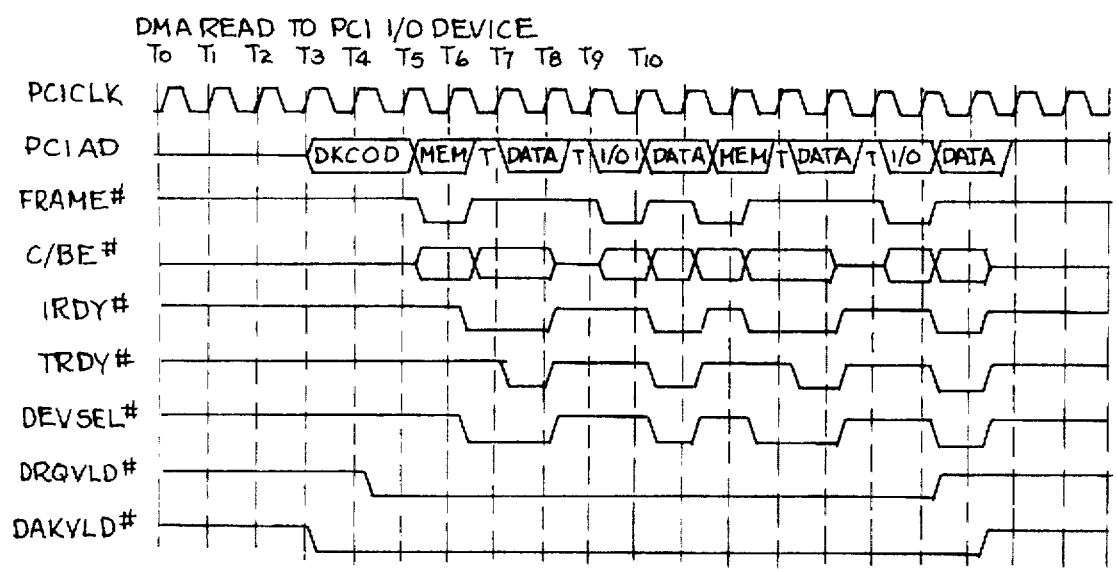
FIG. 3 shows a timing diagram depicting a DMA transfer from memory to a DMA device.

As stated above, a DMA transfer from memory to a DMA I/O device 12 begins with the DMA I/O device 12 requesting a DMA transfer and the arbiter 24 granting the PCI bus 14 to the DMA controller 16 for the transfer. Referring to FIGS. 1 and 3, after the DMA controller 16 is granted the PCI bus, the DMA controller 16 asserts a DAKVLD# signal to the DMA I/O device 12 at a time $T_3$. During the same PCI clock cycle $T_3$, the DMA controller 16 presents an encode state of the DMA controller's 16 internal active DMA acknowledge signal (DACK#) and terminal count signal (TC) on the PCI bus 14. The DMA I/O device 12 must acknowledge the DAKVLD# signal within two PCI clock cycles. As can be seen from FIG. 3, the DMA I/O device 12 acknowledges the DAKVLD# signal by asserting the DRQVLD# signal during the next PCI clock cycle, $T_4$. The DMA I/O device 12 keeps the DRQVLD# signal asserted until the DMA I/O device 12 does not require any more DMA cycles.

After the exchange of DAKVLD# and DRQVLD# signals, the address of the memory location is placed on the PCI bus 14 during the PCI clock cycle $T_5$. The DMA controller 16 will read the data from the memory location to a temporary storage location at a time $T_7$. The temporary storage location is generally the DMA controller 16. The address of the DMA I/O device 12 to where the data will be written to is then placed on the PCI bus 14 during the PCI clock cycle $T_9$. The DMA controller 16 then writes the data to the DMA I/O device 12 at a time $T_{10}$. This process continues for as long as the DMA I/O device 12 keeps the DRQVLD# signal asserted or for as long as the DMA controller 16 is programmed. When the DMA I/O device 12 is finished with the DMA transfer, the DMA I/O device 12 deasserts the DRQVLD# signal and the DMA transfer is completed when the DMA controller 16 deasserts DAKVLD# in response.

While the invention has been particularly shown and described with reference to preferred embodiments thereof, it will be understood by those skilled in the art that the foregoing and other changes in form and details may be made therein without departing from the spirit and scope of the invention.

I claim:

1. A system for supporting direct memory access (DMA) input/output (I/O) devices on a peripheral component interconnect (PCI) bus comprising, in combination:

a PCI bus for transferring data to and from memory;

at least one DMA I/O device means directly coupled to said PCI bus for requesting a DMA transfer to at least one of receive data transferred from said memory and to transfer data to said memory;

DMA controller means coupled to said PCI bus and directly coupled to said at least one DMA I/O device means for receiving a signal from said at least one DMA I/O device means that a DMA transfer is required and for permitting transfer of said data to said at least one DMA I/O device means from said memory and for permitting transfer of said data from said at least one DMA I/O device means to said memory;

serial link signal means coupled to said at least one DMA I/O device means and said DMA controller means for allowing said at least one DMA I/O device means to signal said DMA controller means that a DMA transfer is required;

arbiter means coupled to said DMA controller means for receiving a signal from said DMA controller means that said DMA transfer has been requested and for granting said PCI bus means to said DMA controller means for said DMA transfer;

first signal line means coupled to said at least one DMA I/O device means and to said DMA controller means for signaling said at least one DMA I/O device means when said DMA transfer has been granted and for signaling said at least one DMA I/O device means a code indicating active DMA channels as a subset of PCI address lines;

second signal line means coupled to said at least one DMA I/O device means and to said DMA controller means for signaling said DMA controller means when said at least one DMA I/O device means acknowledges said DMA transfer has been granted, said second signal line means being a realtime representation of said at least one DMA I/O device DMA request and is asserted until said at least one DMA I/O device means requires no more DMA cycles.

2. A system for supporting DMA I/O devices on a PCI bus in accordance with claim 1 wherein said DMA controller means is an AT compatible DMA controller means.

3. A system for supporting DMA I/O devices on a PCI bus in accordance with claim 2 further comprising:

secondary PCI bus means coupled to said DMA controller means for carrying said memory data and said data during a DMA transfer over said secondary PCI bus means;

at least one secondary DMA I/O device means coupled to said secondary PCI bus means for receiving said memory data transferred from said memory to said at least one secondary DMA I/O device means and for transferring said data to said memory from said at least one secondary DMA I/O device means;

serial link signal line means coupled to said at least one secondary DMA I/O device means and said DMA controller means for allowing said at least one secondary DMA I/O device means to signal said DMA controller means that said DMA transfer is required;

first signal line means coupled to said at least one secondary DMA I/O device means and to said DMA controller means for signaling said at least one secondary DMA I/O device means when said DMA transfer has been granted and for signaling said at least one secondary DMA I/O device means a code indicating active DMA channels as a subset of PCI address lines; and second signal line means coupled to said at least one secondary DMA I/O device means and to said DMA controller means for signaling said DMA controller means when said at least one secondary DMA I/O device means acknowledges said DMA transfer has been granted, said second signal line means being a realtime representation of said at least one secondary DMA I/O device DMA request and is asserted until said at least one secondary DMA I/O device means requires no more DMA cycles.

4. A system for supporting DMA I/O devices on a PCI bus in accordance with claim 3 wherein said signaling means coupled to said at least one secondary DMA I/O device means and said DMA controller means is a serial link.

5. A system for supporting DMA I/O devices on a PCI bus in accordance with claim 4 wherein said arbiter means grants control of said secondary PCI bus means to said DMA controller means when said DMA transfer by said secondary DMA I/O device means is required.

6. A method of transferring memory data from memory to a direct memory (DMA) input/output (I/O) device coupled to a peripheral component interconnect (PCI) bus comprising the steps of:

providing a system to support said DMA I/O devices on a PCI bus comprising:

at least one DMA I/O device means for receiving said memory data transferred from memory to said at least one DMA I/O device means;

DMA controller means coupled to said at least one DMA I/O device means for receiving a signal from said at least one DMA I/O device means that a DMA transfer is required and for permitting transfer of said memory data to said at least one DMA I/O device means from said memory;

signaling means coupled to said at least one DMA I/O device means and said DMA controller means for allowing said at least one DMA I/O device means to signal said DMA controller means that said DMA transfer is required;

arbiter means coupled to said DMA controller means for receiving a signal from said DMA controller means that said DMA transfer has been requested and for granting said PCI bus means to said DMA controller means for said DMA transfer;

first signal line means coupled to said at least one DMA I/O device means and to said DMA controller means for signaling said at least one DMA I/O device means when said DMA transfer has been granted;

second signal line means coupled to said at least one DMA I/O device means and to said DMA controller means for signaling said DMA controller means when said at least one DMA I/O device means acknowledges said DMA transfer has been granted; and PCI bus means coupled to said at least one DMA I/O device means for transferring said memory data to said at least one DMA I/O device means from said memory;

sending a signal from said DMA I/O device means to said DMA controller means via said serial link means coupled to said DMA I/O device means and said DMA controller means requesting said DMA transfer from said memory to said DMA I/O device means;

sending a signal from said DMA controller means to said arbiter means when said DMA controller means receives said signal that said DMA transfer from said memory to said DMA I/O device means is required;

waiting for said arbiter means to grant said PCI bus means to said DMA controller means for use during said DMA transfer;

sending a signal from said DMA controller means to said DMA I/O device means that use of said PCI bus means for said DMA transfer has been granted;

sending a signal from said DMA I/O device means to said DMA controller means acknowledging said signal from said DMA controller means to said DMA I/O device means that use of said PCI bus means for said DMA transfer has been granted; and transferring said memory data from said memory to said DMA I/O device means.

7. The method of claim 6 wherein said step of providing a system to support said DMA I/O devices on a PCI bus further comprises the step of providing serial link means for said signaling means coupled to said at least one DMA I/O device means and said DMA controller means for allowing said at least one DMA I/O device means to signal said DMA controller means that said DMA transfer is required.

8. The method of claim 7 wherein said step of sending a signal from said DMA controller means to said DMA I/O device means that use of said PCI bus means for said DMA transfer has been granted further comprising the step of presenting a code indicating active DMA channels on a subset of said PCI bus means.

9. The method of claim 8 wherein said step of transferring said memory data from said memory to said DMA I/O device means comprises the steps of:

reading said memory data from said memory to a temporary location; and writing said memory data from said temporary location to said DMA I/O device means.

10. The method of claim 9 wherein said temporary location is said DMA controller means.

11. A method of transferring data from a direct memory access (DMA) input/output (I/O) device coupled to a peripheral component interconnect (PCI) bus to memory comprising the steps of:

providing a system to support DMA I/O devices on a PCI bus comprising:

at least one DMA I/O device means for transferring said data to said memory from said at least one DMA I/O device means;

DMA controller means coupled to said at least one DMA I/O device means for receiving a signal from said at least one DMA I/O device means that a DMA transfer is required and for permitting transfer of said data from said at least one DMA I/O device means to said memory;

signaling means coupled to said at least one DMA I/O device means and said DMA controller means for allowing said at least one DMA I/O device means to signal said DMA controller means that a DMA transfer is required;

arbiter means coupled to said DMA controller means for receiving a signal from said DMA controller means that said DMA transfer has been requested and for granting said PCI bus means to said DMA controller means for said DMA transfer;

first signal line means coupled to said at least one DMA I/O device means and to said DMA controller means for signaling said at least one DMA I/O device means when said DMA transfer has been granted;

second signal line means coupled to said at least one DMA I/O device means and to said DMA controller means for signaling said DMA controller means when said at least one DMA I/O device means acknowledges said DMA transfer has been granted; and PCI bus means coupled to said at least one DMA I/O device means for transferring said data from said at least one DMA I/O device means to said memory;

sending a signal from said DMA I/O device means to said DMA controller means via said serial link means between said DMA I/O device and said DMA controller means requesting said DMA transfer to said memory from said DMA I/O device means;

sending a signal from said DMA controller means to said arbiter means when said DMA controller means receives said signal that said DMA transfer to said memory from said DMA I/O device means is required;

waiting for said arbiter means to grant said PCI bus means to said DMA controller means for use during said DMA transfer;

sending a signal from said DMA controller means to said DMA I/O device means that use of said PCI bus means for said DMA transfer has been granted;

sending a signal from said DMA I/O device means to said DMA controller means acknowledging said signal from said DMA controller means to said DMA I/O device means that use of said PCI bus means for said DMA transfer has been granted; and transferring said data from said DMA I/O device means to said memory.

12. The method of claim 10 wherein said step of providing a system to support said DMA I/O devices on a PCI bus further comprises the step of providing serial link means for said signaling means coupled to said at least one DMA I/O device means and said DMA controller means for allowing said at least one DMA I/O device means to signal said DMA controller means that said DMA transfer is required.

13. The method of claim 12 wherein said step of sending a signal from said DMA I/O device means to said DMA controller means that use of said PCI bus means for said DMA transfer has been granted further comprising the step of presenting a code indicating active DMA channels on a subset of said PCI bus means.

14. The method of claim 13 wherein said step of transferring said data from said DMA I/O device means to said memory comprises the steps of:

reading said data from said DMA I/O device means to a temporary location; and writing said data from said temporary location to said memory.

15. The method of claim 14 wherein said temporary location is said DMA controller means.

* * * * *